W. EVANS.
MACHINE FOR MAKING SPRING EYES.
APPLICATION FILED JULY 1, 1921.

1,426,165.

Patented Aug. 15, 1922.
6 SHEETS—SHEET 3.

ON LINE 4—4, FIG. 1.

INVENTOR
William Evans.
BY
ATTORNEYS

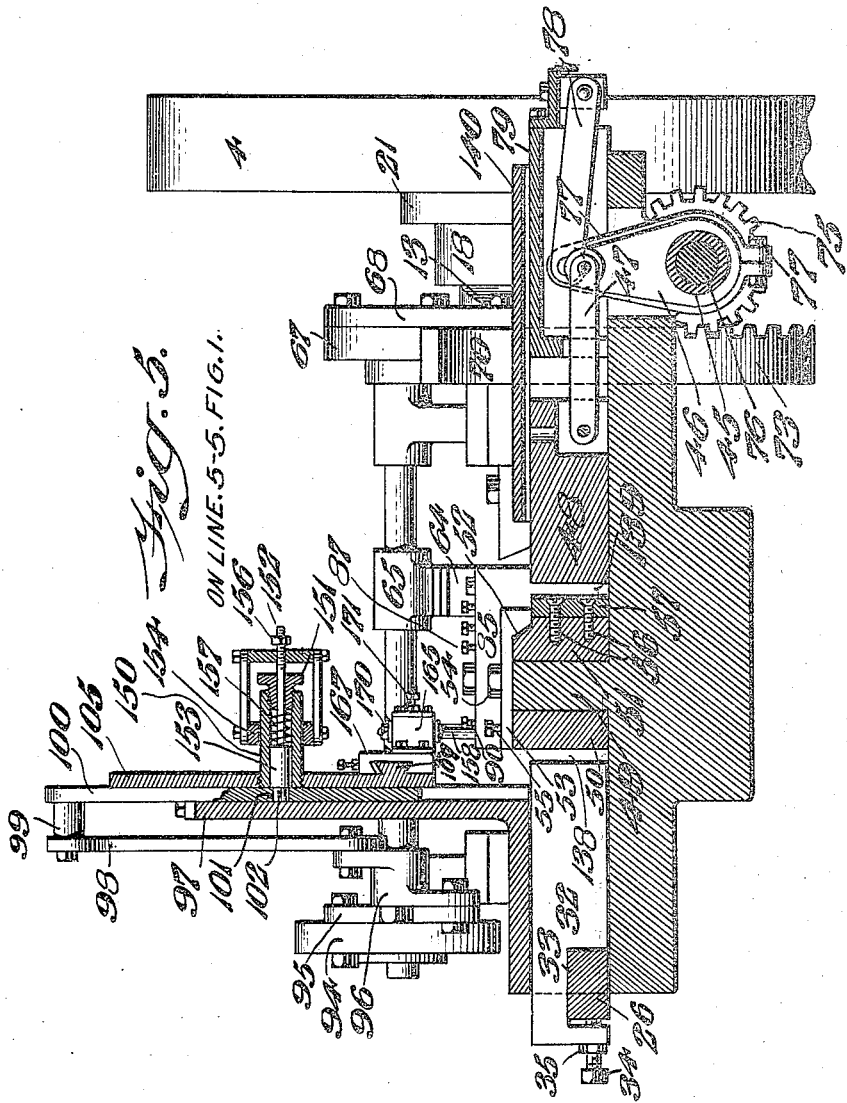

W. EVANS.
MACHINE FOR MAKING SPRING EYES.
APPLICATION FILED JULY 1, 1921.
1,426,165.
Patented Aug. 15, 1922.
6 SHEETS—SHEET 5.
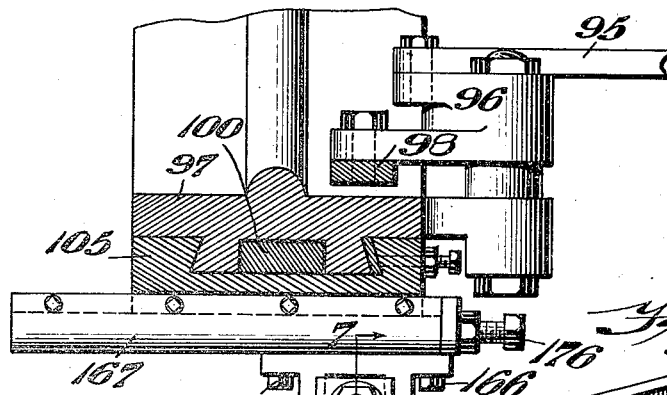
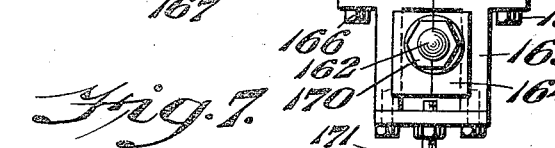
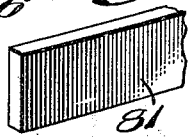
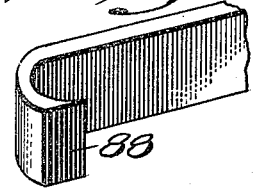
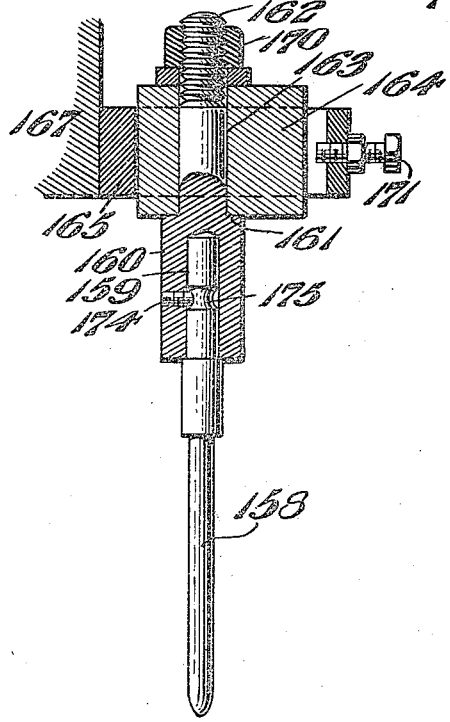
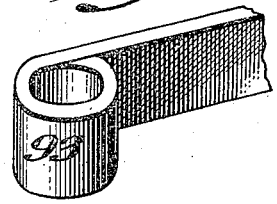
INVENTOR
William Evans.
BY
Thiedersheim Fairbanks
ATTORNEYS

W. EVANS.
MACHINE FOR MAKING SPRING EYES.
APPLICATION FILED JULY 1, 1921.

1,426,165.

Patented Aug. 15, 1922.
6 SHEETS—SHEET 6.

INVENTOR
William Evans.
BY
ATTORNEYS

UNITED STATES PATENT OFFICE.

WILLIAM EVANS, OF PHILADELPHIA, PENNSYLVANIA, ASSIGNOR TO JOHN EVANS' SONS, OF PHILADELPHIA, PENNSYLVANIA, A FIRM COMPOSED OF WILLIAM EVANS, ROBERT EVANS, AND JOHN H. EVANS.

MACHINE FOR MAKING SPRING EYES.

1,426,165.   Specification of Letters Patent.   Patented Aug. 15, 1922.

Application filed July 1, 1921. Serial No. 481,774.

*To all whom it may concern:*

Be it known that I, WILLIAM EVANS, a citizen of the United States, residing in the city and county of Philadelphia, State of Pennsylvania, have invented a new and useful Machine for Making Spring Eyes, of which the following is a specification.

My present invention is an improvement upon a machine for forming spring eyes invented by me and forming the subject-matter of United States Letters Patent No. 1,339,443, issued May 11, 1920, to which reference is to be made.

Both my former machine and my present machine relates in particular to the art of forming an eye in automobile, carriage and car springs, and both involve an operation in which the completed eye is produced on the spring blank by what are essentially two operations, the first of which imparts a half turn to the end of the bar and also scarfs or bevels the half turned end, and the second of which effects the completed turn of the half-turned and scarfed end to form the completed eye.

In my former invention and in connection with the second operation which forms the completed eye, I made use of a vertically movable cylindrical pin which was adapted to be thrown vertically into and out of operation at the will of the operator, its function when in operation being to assure as far as was possible the cylindrical, internal form of the completed eye, by its co-operation with the finishing die, which as stated, completed the finishing of the eye.

Further to explain the foregoing pin of my patent, it may be said that its application to my former machine contemplated its use in a given position only with reference to the eye, being a definite vertical position in which throughout the operation of the machine, it was intended to remain.

In my present machine, the mounting and movement of the pin in which the features of present novelty chiefly reside, are such that the pin when encompassed by the half bent and scarfed eye of the bar, advances with the latter in the forward operation of the finishing die which imparts to the eye the final bending, and that, therefore, although the pin has a vertical movement, it also has a fore and aft movement, so to speak, during which with first the partly bent end of the spring bar, and then with the completed eye it co-operates with the finishing die.

Apart from a special and novel construction, special and novel means of application to the machine, and special and novel means for effecting both the vertical and the fore and aft movement of said pin, my present invention utilizes all of the features of my patented machine, which are included in the claims of my patent referred to.

Thus, I employ interchangeable tools and scarfing dies to cut the scarf to definite and predetermined lengths corresponding to the desired radius of the completed eye, so that the scarfing is made proportionately to each size of eye in order to assure a true cylindric interior to the eye whatever its diameter.

Other advantages expressed in my former patent as inhering in its machine are also to be found in my present machine, which, moreover, makes use of the clamping means which hold the spring bar in both its first and its second positions,—of the initial bending die which produces the first half turn in the end of the bar,—of the scarfing die which scarfs the end of the initially and partly bent spring bar,—of the finishing die which completes and forms the ultimate eye in the initially bent and scarfed spring bar;—and it further makes use of the means for operation in their desired co-action and sequence of the foregoing clamping means and operation dies.

In order clearly to understand the construction, application and mode of operation of the finishing pin, it will be of advantage to understand the machine itself.

To make such understanding possible, I have, therefore, deemed it advisable to illustrate and describe the entire machine of my former patent to which the features of my improvements are applied and with both the major and the minor elements of which they co-operate.

For the purpose of illustrating my invention, I have shown in the accompanying drawings a certain type and embodiment of it which is at present preferred by me, because in practice it has given satisfactory and reliable results.

It is to be understood, however, that the various instrumentalities in which my invention is shown as embodied can be variously arranged and organized, and that my invention is not, therefore, limited to the precise arrangement and organization of the instrumentalities which are typified in the construction shown in the drawings and herein described.

In the drawings,—

Figure 5 represents a transverse sectional elevation on line 5—5 of Fig. 1.

Figure 6 represents a sectional plan on line 6—6 of Fig. 2.

Figure 7 represents a vertical section on line 7—7 of Fig. 6.

Figure 8 represents in perspective, a portion of the blank or bar from which the spring is formed and before it is bent.

Figure 9 represents in perspective, a portion of the blank as it appears after the first operation of partly bending and swaging has been completed.

Figure 10 represents in perspective, a portion of the spring as it appears after the second or final operation of complete bending has been completed.

Similar numerals of reference indicate corresponding parts.

Referring to the drawings:—

Figure 1:
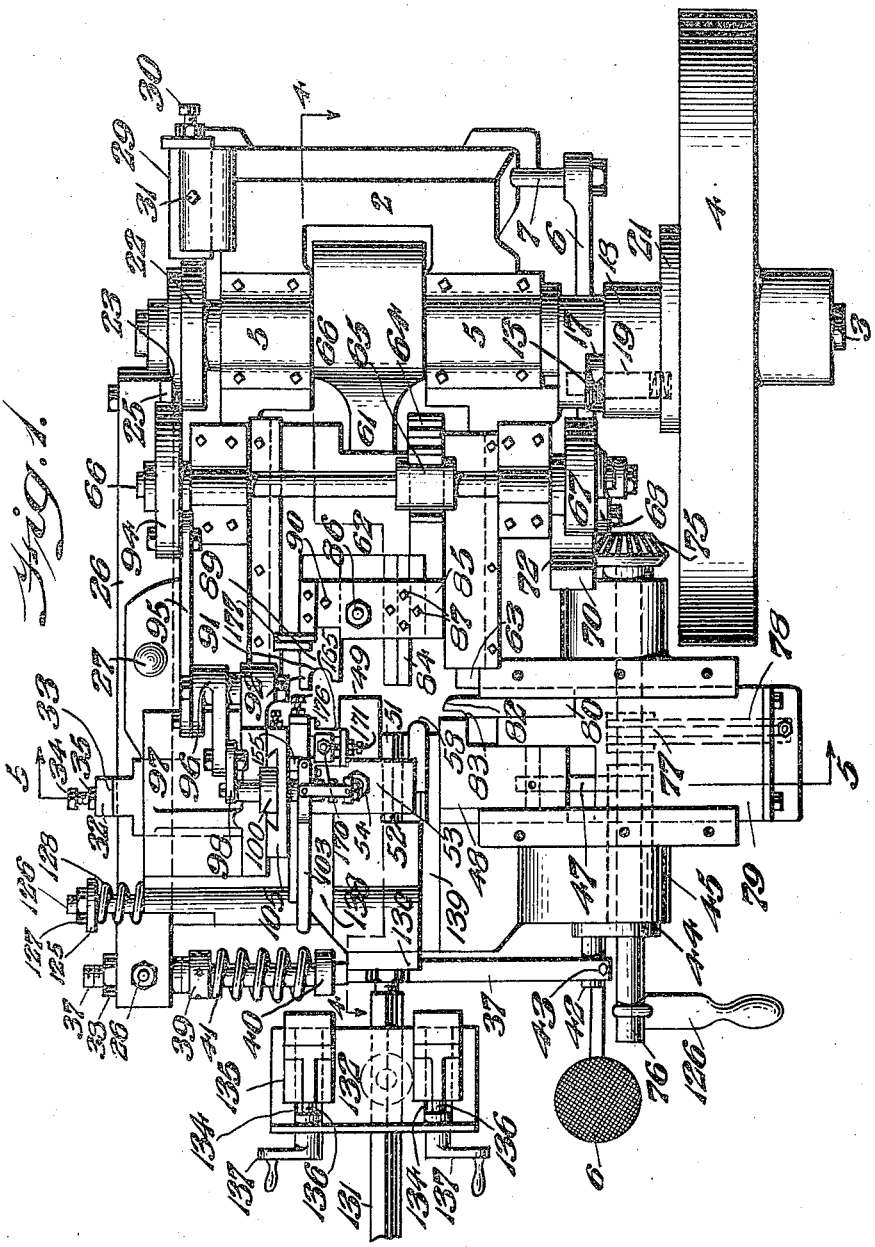
Figure 1 represents a top plan view of a machine for forming eyes of springs embodying my invention, certain of the parts being removed for the sake of clearness of illustration.

1 designates a supporting framework of any desired or conventional construction and which carries at its upper end a table 2, which serves as a support for the operating parts of the machine.

3 designates the main driving shaft which has mounted thereon a pulley or fly wheel 4, which is adapted to be connected with any desired source of power either electrical or otherwise.

The driving shaft 3 is rotatably mounted in the journals 5 carried by the table 2. The pulley or fly-wheel 4 is loosely mounted on the shaft 3 and its operative connection with the driving shaft 3 is controlled by means of a treadle 6, which is fulcrumed at its rear end as at 7 to the framework 1, said treadle operating any suitable form of clutch mechanism, adapted to cause the main shaft 3 to rotate in unison with or independently of the fly wheel.

Figure 2:
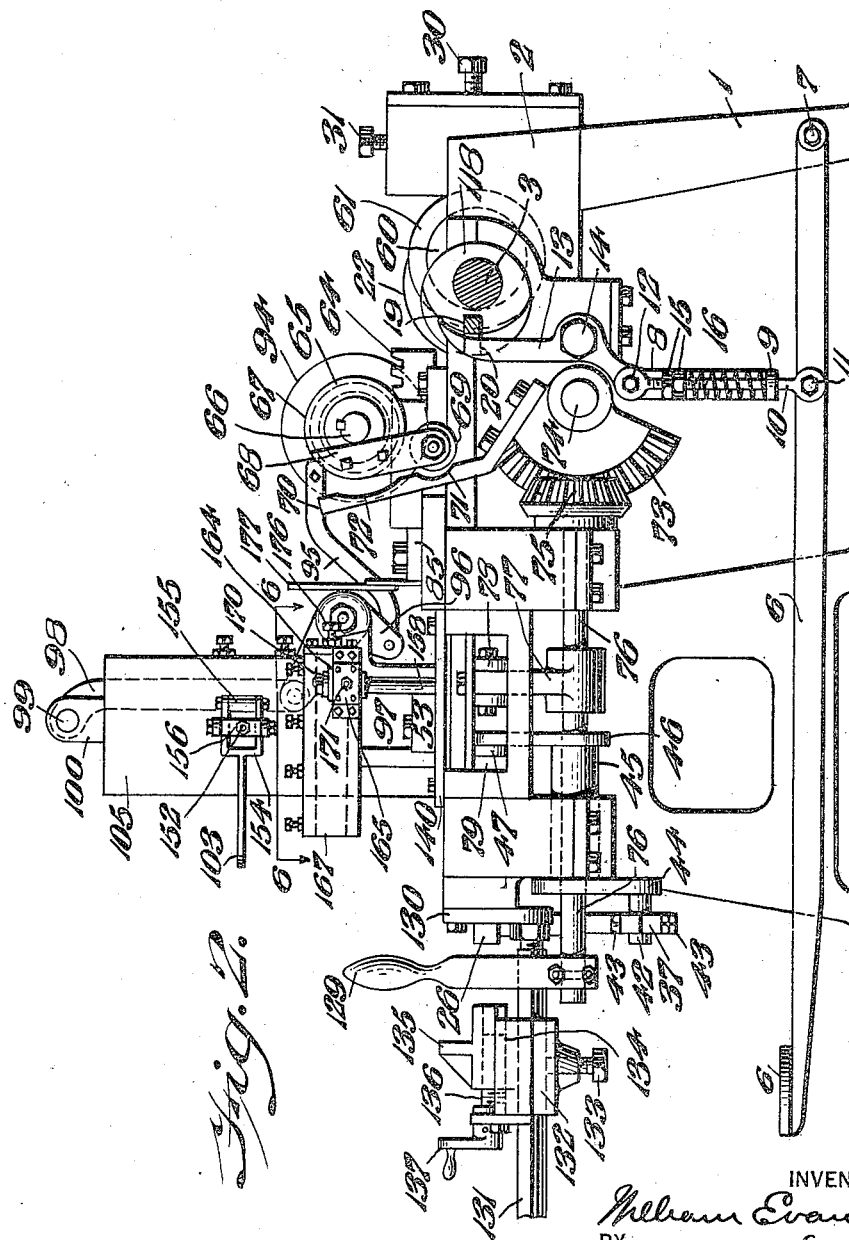
Figure 2 represents a side view of the machine of Figure 1, the main driving shaft being shown in section.

I have shown one form of such clutch mechanism in Figs. 1 and 2, which I will describe generally, although it is to be understood that other forms of such clutch mechanism may be employed.

The table 2, see Fig. 2, has secured to it a depending bracket 8, which at its lower end is provided with the laterally extending flange 9, through which extends a link 10, the lower end of which is pivotally connected at 11 with the treadle 6. The upper end of the link is pivotally connected at 12 to an elbow lever 13, which is fulcrumed at 14 on the table 2.

The rod of the link 10 is threaded and provided with a plurality of adjusting nuts 15, one of which serves as a lock nut to control the tension of the spring 16, one end of which abuts against the flange 9, while the other end thereof abuts against one of the nuts 15, said spring encircling the rod of the link 10. The rear face of the upper arm of the elbow lever 13 is curved and adapted normally to pass into a slot 17 in a collar 18 fixed in any desired manner to the shaft 3.

Laterally movable in the collar 18 so as to move across the wall of the slot 17, is a spring-pressed locking plunger 19, which has a slot or recess 20 into which the upper end of the elbow lever 13 extends to retain the locking plunger in inoperative position. When, however, the treadle 6 is depressed, the elbow lever 13 will be rocked on its fulcrum 14 and its upper end will be moved out of engagement with the locking plunger, whereupon the spring of the locking plunger will cause it to pass into and interlock with the hub 21 of the pulley or flywheel 4, which is loosely mounted on the driving shaft 3, so that the pulley or flywheel 4 will then be operatively connected with the shaft 3, so that the shaft 3 will begin to revolve.

As the above described clutch mechanism forms no part per se of my invention, I deem it unnecessary to describe it with greater particularity.

Figure 3:
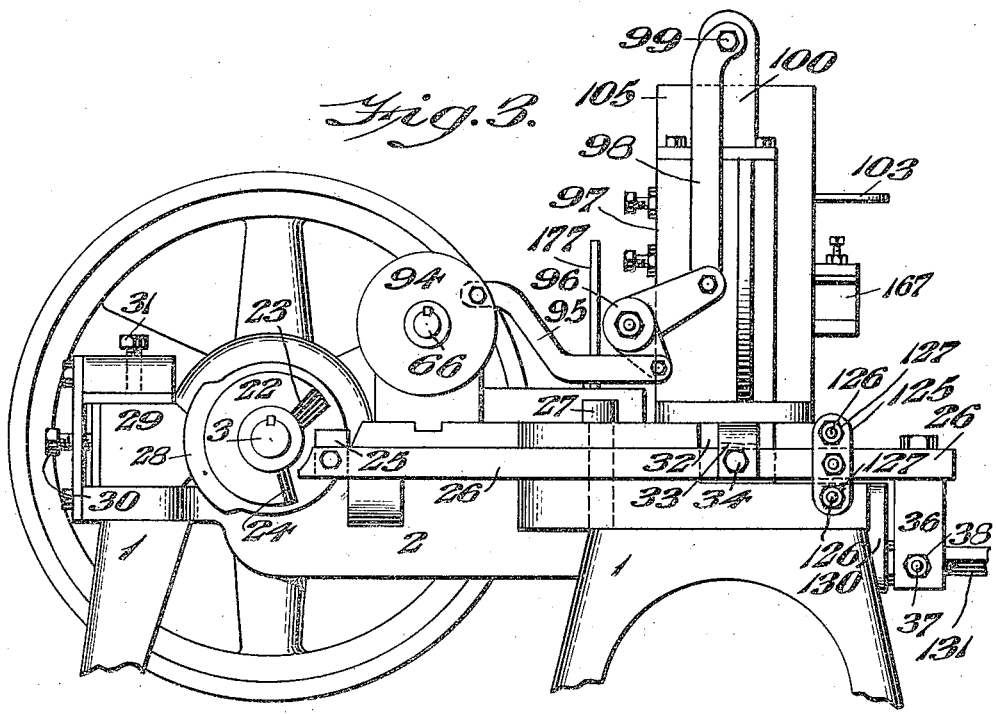
Figure 3 represents in side elevation, the opposite side of the machine from that shown in Fig. 2, certain parts of the construction being removed for the sake of clearness of illustration.

The main driving shaft 3 has at one end secured to it, the cam 22, having a portion of its periphery cut away, as indicated at 23 and 24, Figs. 1 and 3, such cut away portions being suitably beveled in order to co-operate with a removable wear plate 25 removably connected to an end of rock bar 26, which is fulcrumed at 27 on the table 2.

The cam 22 has a portion of its periphery, as at 28, see Fig. 3, of greater diameter in order to co-operate with a tension block 29, the face of which is curved to conform to the face of the periphery 28 of the cam, said block 29 being secured in its adjusted position by means of the set screws 30 and 31, which serve to retain it in its adjusted position, so that if the momentum of the machine should cause the shaft to continue to revolve momentarily when the operator removes his foot from the treadle 6, the engagement of the periphery 28 of the cam with the tension block 29 would cause the moving parts to be arrested or assume such position that the clamping jaws hereinafter referred to would be in open position.

32 designates one of the movable clamping jaws, best seen in Figs. 1, 3, 5, 11 and 12, which is slotted as at 33 in order to permit the rock bar 26 to pass through it. The movable jaw 32 is relatively connected with the rock bar 26 by means of a set screw 34 in threaded engagement with the movable jaw and having its forward end contacting against the rock bar 26, a lock nut 35 being provided to maintain the set screw 34 in its adjusted position.

The forward end of the rock bar 26 has secured to it a depending arm 36, see Fig. 3, having passing laterally through it a rod 37, see Fig. 1, provided at its outer end with a nut 38. The rod 37 passes loosely through a sleeve bushing 39, which is in threaded engagement with the arm 36. The rod 37 has also fixed to it a collar 40 between which and the sleeve bushing 39 is interposed a spring 41 serving as a tension device for the rod 37.

The rod 37 at its free end terminates in a split collar. The forward end of the rod 37 is apertured to receive a pin 42 and is also split so that the pin 42 can be clamped with respect to it by means of a fastening device 43.

The pin 42 is secured to one end of an arm 44, as illustrated in Figs. 1 and 2, which at its other end is provided with a rearwardly extending sleeve 45. The sleeve 45 has fixed to it an upwardly extending rock arm 46 to which is pivotally connected one end of a link 47, the other end of said link being pivotally connected to the other movable clamping jaw 48, see Figs. 1, 5, 11 and 12.

It will thus be seen that upon the rocking of the rock bar 26 by the cam 22, the movable clamping jaws 32 and 48 will be moved toward each other, at the proper intervals.

Figure 11:
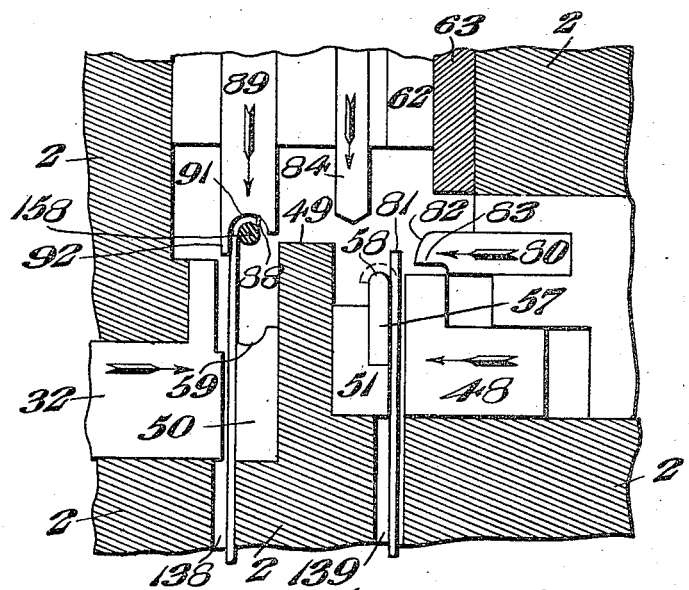
Figure 11 represents in diagrammatic plan, the normal positions and relation of the blank and the dies for operating upon it, as hereinafter explained.
Figure 12:
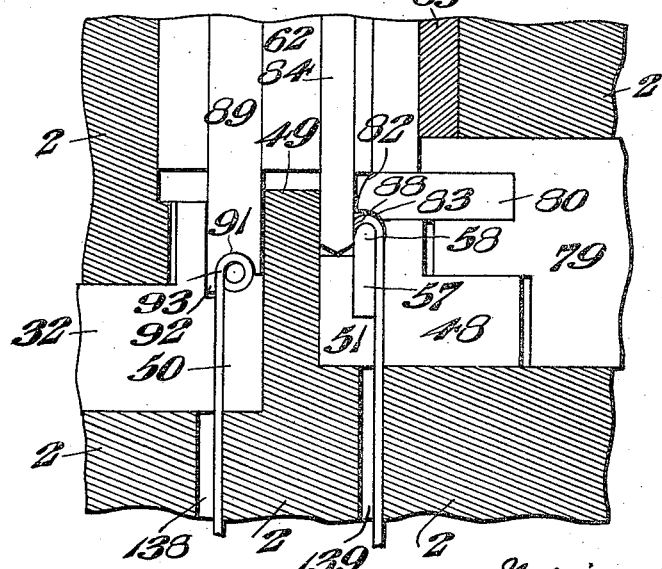
Figure 12 represents a view similar to that of Fig. 11, with the blank and dies in advanced positions as hereinafter likewise explained.

The table 2, see Figs. 5, 11 and 12, is provided with an upward extension 49 on opposite sides of which are respectively positioned the fixed dies 50 and 51.

The fixed die 51 is angularly recessed at its top as at 52, see Fig. 5, in order to receive the downwardly deflected portion of a clamping plate 53, which is fixed in position by means of a fastening device 54. The clamping plate 53 is provided with a set screw 55, which is in threaded engagement with it and engages the fixed die block 50 to secure it in position as will be understood by reference to Fig. 5.

The block or fixed die 51 has also secured to its side face by means of fastening devices 56, a die 57, whose extremity is rounded as indicated at 58, see more particularly Figs. 11 and 12. The die block 50 is provided at its inner end with a curved recessed portion 59, which co-acts with the working face 92 of the finishing die 89 to be hereafter referred to.

Figure 4:
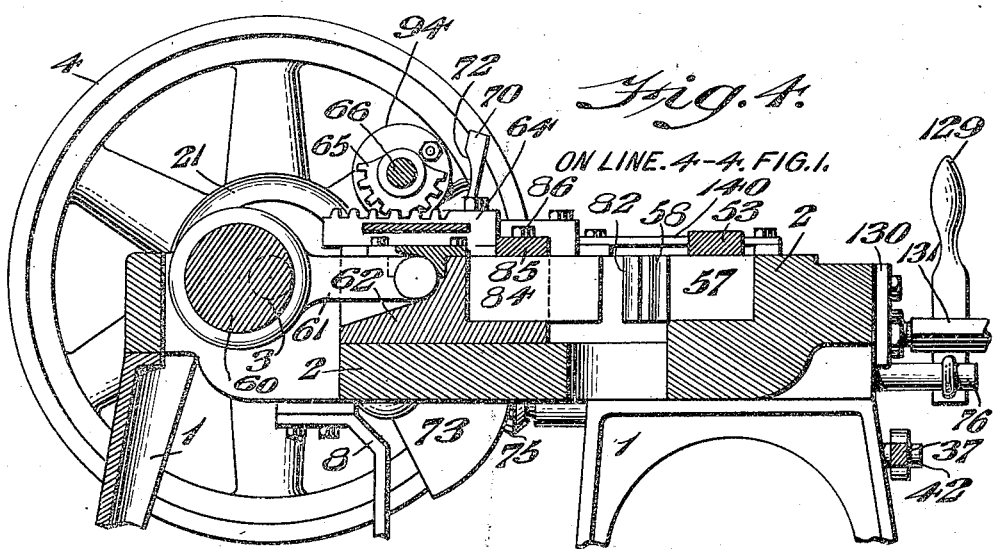
Figure 4 represents a side sectional elevation on line 4—4 of Fig. 1.

Referring now more particular to Figures 1 and 4, I will first describe the manner in which the first movable die is operated to form the first operation on the blank.

The main driving shaft 3, see Fig. 4, is provided with an eccentric 60 on which is mounted an eccentric strap having the connecting rod 61, which is pivotally connected in any suitable manner to a cross-head 62 guided in the table 2. A replaceable wear plate 63 is preferably employed, the cross-head 62 carrying at its upper end a rack bar 64 with which a mutilated pinion 65 is geared, said pinion 65 being fixed to an oscillating or rocking shaft 66 journalled on the table 2.

The shaft 66 at one end has connected with it a disk 67 to which is secured an arm 68, which latter carries at its lower end a roller 69, see Fig. 2, which latter moves in the path of the arm 70 provided with the juxtaposed curved or cam faces 71 and 72. The arm 70 at its lower end is fixed to a gear segment 73 mounted on a stud shaft 74 carried by the table 2, said gear segment 73 meshing with a gear 75 mounted on a shaft 76, suitably journaled on the table 2. The shaft 76 has fixed to it one end of an arm 77 to the other end of which is pivotally connected one end of a link 78, the opposite end of said link being pivotally connected with the slide 79.

The slide 79 is recessed to receive the movable die 80 which performs the first step in the bending of the spring plate or blank 81, to a half turn, see Figs. 11 and 12, the extremity of said blank initially appearing as seen in Fig. 8.

The front or forward face of the movable die 80 curves outwardly, as indicated at 82, while the side face contiguous to the blank during the bending operation, is cut away as indicated at 83 in order to conform to the thickness of the spring blank, and to properly effect the initial bending operation.

It will thus be seen that during the initial forward movement of the cross-head 62, the end of the spring blank will be initially bent to a half turn, as shown in dotted lines in Fig. 11.

As the cross-head 62 moves forwardly, it moves with it the scarfing die 84, which is secured to the cross-head 62 by means of fastening devices 86. The clamping plate 85 is provided with clamping screws 87, see Fig. 1, which serve to retain the scarfing die 84 in fixed position with respect to the cross-head 62.

The parts are timed in such a manner that as soon as the movable die 80 completes its forward movement, or has moved from the position seen in Fig. 11 to the position seen in Fig. 12, the scarfing die 84 advances from the position seen in Fig. 11 into that seen in Fig. 12, and the free end of the spring plate or blank after being initially bent is scarfed, or beveled as indicated at 88, see more particularly Fig. 9.

It will be understood that after the completion of the operation just described, the spring which has thus been initially bent to a half turn and scarfed is manually removed and placed between the movable clamping jaw 32 and the fixed die block 50, as seen in dotted lines at the left of Fig. 11.

The next operation is that of the finishing die 89, which will now be described.

The cross head 62 has also mounted in it, a finishing die 89 which is secured in position by means of a clamping screw 90, see Fig. 1, the clamping screw 90 being carried by the clamping plate 85. The operative end of the finishing die 89 is provided with a semi-cylindrical working face 91 and with a forward extension 92, so that when said finishing die 89 moves forwardly and acts upon the half turned end of the spring plate or blank clamped between the movable clamping jaw 32 and the die block 50, a completed eye 93 will be formed at the end of the spring, as will be understood by reference to Figs. 10 and 12.

It will be understood from Fig. 1, that the dies 84 and 89 move forward and back toward and away from the operator, while the initial bending die moves at a right angle to the line of movement of said dies, 84 and 89.

In connection with the mounting and formation of my improved pin 158, as hereinafter explained, and its fore and aft movement in co-action with the finishing die 89, the means which I employ to raise and insert it into the incompleted eye and subsequently to withdraw it are the following:—

The shaft 66 carries at one end a disk 94, see Figs. 1, 3 and 5, which has connected to it near its periphery a bent arm 95, the free end of which is connected to one end of a bell crank lever 96, which is fulcrumed on a standard 97 rising from the table 2. The upper end of the bell crank lever 96 has connected to it one end of a link 98, the other end of which is pivotally mounted on a pin 99 carried by a vertically reciprocating slide bar 100.

The slide bar 100 is adapted to receive a laterally movable pin 102, which is of the following construction and mounting:—

Referring now to Figures 1, 2, 3, 5, 6 and 7,—a hollow sleeve 150 extends transversely outward from the sliding head 105, being preferably attached by being screwed into a threaded aperture therein, so that it opens through said sliding head and is externally closed by a longitudinally apertured screw plug 151, through which passes a rod 152 which, within the sleeve 150, is connected with or formed into a diametrically enlarged boss 153, see Figure 5, which abuts against the slide bar 100 and from which, and as a continuance thereof, extends the pin proper 102.

As will be seen in Figures 1, 2 and 5, the handle 103 is extended as and terminates in a yoke, 154, the inner arms of which are fulcrumed at 155, see Figure 2, the fulcrum being mounted on and extending from the sliding head 105.

The rod 152, see Figure 5, extending beyond the handle yoke 154, see Figure 2, is provided with a nut 156, by which adjustment can be made with relation to the rod 152, so that through the intervention of a coiled spring 157 located within the sleeve 150 and between the plug 151 and the boss 153 of the pin proper 102, adjustment of the in and out movement of said pin proper 102 may be made.

By the operation of the handle, it will therefore be understood, that when the pin 102, under the stress of the spring, is within the aperture 101, it can be drawn out of said aperture so as to free the connection between the sliding bar 100 and the sliding head 105.

The foregoing construction replaces that of my patent referred to in which the handle is controlled by a spring designated in the patent 106, and located between its fulcrum and the sliding head.

My novel device considered as a whole is capable of exact adjustment and operation, without dependency upon the tension of the spring 106 as in my patent.

It having already been explained that the former or finishing pin 158 which co-operates with the finishing die 89 in having, when the partly bent and scarfed blank has been hooked around it, a fore-and-aft movement which in conjunction with said finishing die imparts a true cylindric interior to the eye during the period of its ultimate bending,—the mounting and construction of said former or finishing pin is the following:—

Referring to Figures 1, 2, 3, 5, 6 and 7,— the former pin, as I will term it, is designated 158, and is vertically supported in the hollow bore 159 of a depending stud 160, which, see Figures 6 and 7, is shouldered at 161 and extends longitudinally and upward in the form of a diametrically contracted threaded bolt 162 which passes through a vertical aperture 163 in a carrying block 164 which is supported within a block frame 165 secured by bolts or kindred fastenings 166 to the front face of a travelling slide 167, which, see Figures 5 and 6, is internally grooved at 168 to fit and travel longitudinally fore and aft upon a horizontal tongue 169 on the sliding head 105.

The carrying block 164 is transversely adjustable within its frame 165 by the supplemental bolt 171 which threads through the end plate 173 of the frame 165.

This device affords a means of adjustment for the former pin 158, which is conveniently held within the bore 159 of the stud 160, by a fastening screw 174 which engages within a circular groove or depression 175 formed on the pin.

The inner end of the travelling slide 167 is provided, see Figure 6, with a stop bolt 176, which in the setting up of the machine for operation is suitably adjusted to make the desired contact with a vertically disposed stop bar 177 erected from the cross head 62.

This stop bar 177 moves forward with the cross bar in its final forward movement to occasion the operation of the finishing die 89,—so that said die 89 acting on the partly bent and scarfed eye, see Fig. 9, with the former pin within it, moves the travelling slide 167 and the former pin connected and travelling with said slide, forward or towards the operator to complete the formation of the eye.

The set of the finishing die 89 is such that the former pin 158 can have the partly bent eye hooked upon it in the groove 138, when the set of the former pin has been manually adjusted to proper concentric relationship with the semi-cylindric working face 91 of the finishing die 89, so that there is co-action between the finishing die 89 and the pin 158 throughout their forward movement and until the pin is vertically withdrawn from the finished eye.

The rock bar 26 has secured to it a plate 125, see Fig. 3, through which pass the threaded rods 126, which are fixed in the table 2 at one end, their outer ends passing freely through the plate 125 and being provided with nuts 127. Between the plate 125 and the table 2 are interposed springs, concealed in the drawing by the plate 125, the tendency of which is to move the forward end of the rock bar 26 outwardly so that the plate 25 will always be in engagement with or properly positioned in the path of the cam 22, see Fig. 3.

When it is desired to adjust the position of the dies by hand, such adjustment can be accomplished by actuating the handle 129, which is connected to the shaft 76.

I also provide a gage for holding the springs in proper position to be clamped in the machine. The table 2 has secured to it at its forward end a bracket 130, and in threaded engagement with this bracket is a forwardly projecting polygonally shaped guide bar 131 on which is mounted a guide bracket 132, which is secured in its adjusted position by means of a set screw 133. This guide bracket is provided with guide ways 134, in which are longitudinally slidable the blocks 135 having a threaded opening to receive the threaded rods 136, which are connected to their respective handles 137, it being understood that said blocks 135 aline with the grooves 138 and 139 seen at the left of Fig. 1 and in Figs. 11 and 12, so that the spring blanks inserted in said grooves for the respective bending operations, will have their ends properly positioned at all times with respect to the initial bending die 80, the scarfing die 84, and the finishing die 89.

140 designates a plate secured to the table 2 and serving as a cover for certain of the moving parts.

The operation is as follows, and while, of course, it is necessary herein to describe the means for imparting the movements of the movable clamping jaws 32 and 48 with relation to the fixed die blocks 50 and 51,— the operation of the movable die 80 which performs the initial bending of the blank, and of the scarfing die 84 which performs the operation of scarfing,—as well, of course, as the operation of the finishing die 89, all as in my former patent,—it is to be clearly understood that in my present machine, I operate upon one blank at a time, first, to impart to it its initial bending, then its scarfing and then its ultimate bending,—and that in so operating upon such one blank at a time, I introduce it, first, into the groove 139 within which it is partly bent and scarfed, and, then, into the groove 138 in which it is finished.

This being the case, it will be understood that while the clamping jaws 32 and 48 are both operative at the same time with reference to the fixed die blocks 50 and 51, the conjoint clamping action which is effected, is only performed first upon the die within the groove 139 and then upon the same die removed and placed in the groove 138.

It is also to be understood that while the finishing die 89 has an advance movement synchronously with the advance movement of the scarfing die 84,—it is an idle movement when the blank is in the groove 139,—and that, similarly, the transverse movement of the die 80 which effects the first half bend, and the advance movement of the scarfing die 84, although taking place, are idle movements when the blank is in the groove 138.

Of course, from the description already given, it will be understood that the former pin 158 is not introduced into within the semi-cylindric working face 91 of the finishing die 89, until the blank has been half bent and scarfed while in groove 139, and then been transferred or put over into groove 138.

Inasmuch as there is no alteration of the major elements which effect the foregoing operations as they are formed and operated in my present machine over and against their construction and operation in the machine of my patent, it is necessary to explain the operation of these elements in both the machine of my patent and that of this application.

The general operation may, therefore, be described as follows:—

The operator first adjusts the guide blocks 135 into the desired position, and then places the spring blanks 81 which are to have their ends bent, one after another, first in the slot or groove 139 and then in groove 138, as seen in Figs. 1, 11 and 12, the rear ends of said blanks engaging the guide blocks, so as to position their forward ends to be bent with respect to the clamping and bending dies.

Upon the depression of the treadle 6, the main shaft 3 is caused to revolve, whereby the clamping of the spring blanks in position one after another, as above explained, so that they will be firmly held one after another during the initial bending, scarfing and finishing operations, is effected.

The rotation of the main shaft 3, rotates the cam 22, seen in Figs. 1 and 3, whereby the rock bar 26 is rocked on its fulcrum 27, which through the intermediate connections causes the movable clamping jaws 32 and 48 to move toward each other and toward the stationary coacting die blocks 50 and 51 respectively.

The dwell in the cam 22 causes the blanks to be clamped rigidly during the bending operations, and at the conclusion of the latter as above explained, the cam 22 causes said movable clamping jaws 32 and 48 to move outwardly and thereby release the spring blank being acted upon, so that it can be removed from the machine.

Referring now to Figs. 2 and 4, it will be seen that the rotation of the main shaft 3 and the eccentric 60 will cause the reciprocation of the cross head 62, whereby a reciprocating movement is imparted to the rack 64, which actuates or oscillates the mutilated pinion 65 and imparts a rocking motion to the rock shaft 66. Through the medium of the disk 67, the arm 68 and the roller 69, seen in Fig. 2, the arm 70 is rocked, thereby rocking the gear 73, and the intermeshing pinion 75, which effects the rotation or oscillation of the shaft 76, which causes the arm 77, see Figure 5, which is connected to the link 78 and to the slide 79, on which is mounted the initial bending die 80, to operate said die 80. During this period the die 80 has moved from the position seen in Fig. 11 to that seen in Fig. 12, and the initial bending of the end of the blank 81 to form a half turn around the curved end 58 of the die 57 is thus effected.

It will be understood that during the forward movement of the cross head 62, which has caused the initial bending operation, said cross head has advanced the scarfing die 84, from about the position seen in Fig. 1 to its position seen in Fig. 11, and a continued forward movement of said cross head brings said scarfing die into the position seen in Fig. 12, so that the end of the spring blank now appears as seen in Fig. 9. When the operator removes his foot from the treadle 6, at the proper period, the wear plate 25 becomes disengaged from the cam 22, and the movable clamping jaws 32 and 48 move away from their fixed die blanks to release the spring blanks which can then, one after another, be removed.

When the high face 28 of the cam 22 comes into engagement with the friction block 29, a braking action is exerted on the moving parts and the main driving shaft 3, so that the machine will stop, when the movable clamping jaws 32 and 48 are open or in about the position seen in Fig. 5, the position of the braking element 29 being then as shown at the left of Fig. 3.

The initially bent and scarfed blank, seen in Fig. 9, is now removed from the groove 139 and placed in the proper position in the groove 138.

The operator now again depresses the treadle 6, which again causes the rotation of the main shaft 3 and, as already explained, again effects the actuation of the cross head 62 and its adjuncts,—it being understood that the movable jaw 32 has now been moved from the position seen in Fig. 11 to the position seen in Fig. 12 and so as to clamp the initially bent and scarfed blank, shown in the groove 138 at the left of Fig. 11.

The continued forward movement of the cross head 62 thereafter advances the finishing die 89, which it carries from the position seen in Fig. 11 to the position seen in Fig. 12, so that the working faces 91 and 92 of said die 89, in conjunction with the curved recess 59 of the fixed die 50, complete the formation of the eye 93, the finished article now appearing as seen in Fig. 10, and in the left hand portion of Fig. 12.

This last named operation is rendered fully effective in the completion of the eye 93, by the actuation of the handle 103, to cause the pin 102, seen in Fig. 5, to enter the aperture 101, so that the slide bar 100 and the sliding head 105 will act as a unit, and cause the tool carrying head 164—165, and adjuncts, to move vertically downward and carry the cylindrical former pin 158 into its concentric position with respect to the finishing die 89, and thus enable the operator to complete the operation as already described.

It will be understood that the slide bar 100 is reciprocated vertically by means of link 98, elbow lever 96 and the arm 95, eccentrically connected to the disk 94, which is fast on the rock shaft 66, as will be understood from Figs. 3 and 5, said slide bar moving freely or idling at all times except when the pin 102 is interlocked with its apertured seat 101, whereupon the parts 100 and 105 and their adjuncts move as a unit.

As in the case of my patented machine, the construction of the cross head 62, and the manner of securing the scarfing die or tool 84 therein, enables me to employ interchangeable tools, for cutting the scarf or bevel 88, seen in Fig. 8, which can be cut at different or predetermined lengths, as may be desired or required, corresponding to the radius of the inside of the eye.

I have also found that in my present construction, there is less tendency for the outer surface of the eye to be concaved during the operation of bending or turning the metal, since whatever irregularity is liable to exist at that point is eliminated by my present novel devices, and methods of operating them.

Having thus described my invention, what I claim as new and desire to secure by Letters Patent, is:—

1. In an eye-making machine, the combination of the following instrumentalities for forming a completed eye on the end of a blank, namely:—means for imparting a half turn to the end of a blank,—means for cutting a scarf on the half-turned end of said blank,—means for effecting the ultimate and complete bending of the partly bent and scarfed end,—and means which operate in continuing advance with the foregoing means, for conjointly with said means imparting a true cylindric interior to the eye during the period of its ultimate bending.

2. In an eye-making machine, the combination of the following instrumentalities for forming a completed eye on the end of a blank, namely:—means for imparting a half turn to the end of a blank,—means for cutting a scarf on the half-turned end of said blank,—means for effecting the ultimate and completed bending of said partly bent and scarfed end, which comprises a finishing die having a semi-cylindric working face, and a former pin of less diameter than that of said working face and introduced concentrically therein,—and means for advancing said finishing die and former pin in the foregoing conjoint and concentric relationship, to effect the ulimate bending of the eye to a true cylindric interior form.

3. In an eye-making machine, means for clamping a blank in position to be operated upon,—means for imparting a half turn to one end of the blank,—means for swaging the outer edge of the half-turned end of the blank,—means for imparting the ultimate bending of the said half-turned and swaged end, which comprise a finishing die having a semicircular open operating end and a former pin co-operating with said die,—and means for moving the aforesaid finishing die and former pin together and simultaneously forward against a fixed die block having a grooved face oppositely corresponding to the face of the finishing die.

4. In an eye-making machine, means for clamping a blank in position to be operated upon,—means for imparting a half turn to one end of the blank,—means for swaging the outer edge of the half-turned end of the blank,—means for imparting the ultimate bending of said half-turned and swaged end, which comprises a finishing die having a semi-circular open operating end, and a former pin co-operating with said die,—means for moving the aforesaid die and former pin together and simultaneously forward against a fixed die block having a grooved face oppositely corresponding to the face of the finishing die,—and means for inserting the pin before the advance of the finishing die and removing it after the completed conjoint advance.

5. In an eye-making machine for producing a completed eye in two operations, the combination of means for retaining a blank to be operated upon in position,—an initial die for imparting a half turn to the end of the blank,—a scarfing die for scarfing the half-turned end,—a finishing die and former pin, which together complete the formation of the eye,—means for occasioning the forward movement of said finishing die and former pin to occasion their contact with a fixed die at the end of their path of movement,—the fixed die aforesaid,—and means independent of the mounting of the finishing die for permitting of both horizontal and vertical movement of said former pin.

6. In an eye-making machine for producing a complete eye from a blank, which comprises means for forming a half turn on the end of the blank and for cutting a scarf thereon,— finishing means for thereafter completing the half turn into a full turn,—means co-operating with the finishing means, which comprises a former pin adapted to have imparted to it independently of each other both an up-and-down movement and a horizontal movement,—means for imparting the up-and-down movement,—and means for imparting the horizontal movement, 7. In a machine of the class described, a cross head,—means for imparting a fore and aft movement to said cross head,—a movable eye-finishing die having a semi-cylindric finishing face,—a stationary fixed die having a correspondingly opposite finishing face,—a vertically disposed former pin adapted to be inserted within but not in contact with the finishing face of said finishing die,—means for occasioning the independent depression and elevation of the former pin,—means connected with the cross head for occasioning the simultaneous advance of the finishing die, the former pin and the blank,—and means for removing said former pin before the removal of the finished blank from the die.

8. In a machine of the class described, a device for supporting a former pin and permitting its horizontal movement when in the desired vertical position, which comprises a travelling slide, a block frame attached to said slide, a carrying block atttached to said block frame, and means for securing the former pin in adjusted position with respect to the carrying block.

9. In a machine of the class described, a device for supporting a former pin and permitting both its vertical movement and its horizontal movement when in the desired vertical position, which comprises a travelling slide, a block frame attached to said slide, a carrying block attached to said block frame, means for securing the former pin in adjusted position with respect to the carrying block, a sliding head to which the travelling slide is connected, a sliding bar vertically reciprocatory with respect to a standard erected upon the frame work and the sliding head, and manually controlled means for connecting and disconnecting the sliding head and the sliding bar.

10. In a machine of the class described, the combination of a standard erected from the frame work,—a sliding bar vertically movable with reference to said standard and apertured to receive a fastening pin,—a sliding head, a hollow sleeve connected with said sliding head,— a spring confined between a boss on the fastening pin and plug within the sleeve,—a boss on the fastening pin,—a plug within the sleeve,—a pin rod extending through said plug,—and a handle connection fulcrumed to the sliding head and adapted against the stress of the confined spring to pull the pin out of its aperture in the sliding bar, and so release the sliding head.

In testimony whereof I have hereunto signed my name this twenty eighth day of June, A. D. 1921.

WILLIAM EVANS.

In the presence of—
J. BONSALL TAYLOR,
JNO B. WALLACE.